US009891114B2

(12) United States Patent
Karlen et al.

(10) Patent No.: US 9,891,114 B2
(45) Date of Patent: Feb. 13, 2018

(54) FLEXIBLE LAMINATED THERMOCOUPLE

(71) Applicant: Hamilton Sundstrand Corporation, Charlotte, NC (US)

(72) Inventors: Eric Karlen, Rockford, IL (US); John Horowy, Rockford, IL (US); William Louis Wentland, Rockford, IL (US); Debabrata Pal, Hoffman Estates, IL (US)

(73) Assignee: HAMILTON SUNDSTRAND CORPORATION, Charlotte, SC (US)

( * ) Notice: Subject to any disclaimer, the term of this patent is extended or adjusted under 35 U.S.C. 154(b) by 932 days.

(21) Appl. No.: 14/289,182

(22) Filed: May 28, 2014

(65) Prior Publication Data

US 2015/0346035 A1 Dec. 3, 2015

(51) Int. Cl.
*G01K 1/00* (2006.01)
*G01K 1/12* (2006.01)
*G01K 7/02* (2006.01)

(52) U.S. Cl.
CPC ........ *G01K 1/12* (2013.01); *G01K 7/02* (2013.01)

(58) Field of Classification Search
USPC .................................................. 374/179, 208
See application file for complete search history.

(56) References Cited

U.S. PATENT DOCUMENTS

| 2,335,358 | A | 6/1943 | Ray |
| 3,397,085 | A | 8/1968 | Cariou |
| 5,031,689 | A | 7/1991 | Jones et al. |
| 5,167,723 | A | 12/1992 | Tsukakoshi |
| 5,251,981 | A | 10/1993 | Kreider |
| 5,629,482 | A | 5/1997 | Vaitkus et al. |
| 5,846,238 | A | 12/1998 | Jackson et al. |
| 5,909,004 | A | 6/1999 | Hedengren et al. |
| 7,029,173 | B2 * | 4/2006 | Engel ................ H01L 35/34 136/236.1 |
| 7,753,584 | B2 | 7/2010 | Gambino et al. |
| 7,864,506 | B2 | 1/2011 | Pal et al. |
| 8,378,205 | B2 | 2/2013 | Sienel |
| 8,557,392 | B2 | 10/2013 | Fujisawa et al. |
| 2001/0020546 | A1 | 9/2001 | Eldridge et al. |
| 2004/0056321 | A1 * | 3/2004 | Parsons ................ G01F 1/692 257/417 |
| 2005/0016576 | A1 * | 1/2005 | Jiang ................ G01K 7/021 136/224 |
| 2005/0169344 | A1 * | 8/2005 | Hutter ................ G01K 7/02 374/14 |

(Continued)

FOREIGN PATENT DOCUMENTS

EP 2411988 A2 2/2012
EP 2648198 A1 10/2013

*Primary Examiner* — Mirellys Jagan
(74) *Attorney, Agent, or Firm* — Cantor Colburn LLP

(57) ABSTRACT

A flexible laminated thermocouple is provided and includes layers of insulation material. At least one of the layers has a longitudinal axis and includes thermocouple conductors formed of differing electrically conductive materials. Each of the thermocouple conductors includes a main section extending along the longitudinal axis and a flange extending transversely to the longitudinal axis. The main sections are insulated from one another and the thermocouple conductors are insulated from thermocouple conductors of another layer.

20 Claims, 2 Drawing Sheets

(56) References Cited

U.S. PATENT DOCUMENTS

| | | | |
|---|---|---|---|
| 2007/0144573 A1* | 6/2007 | Mihara | C03C 17/23 136/205 |
| 2008/0271772 A1* | 11/2008 | Leonov | G01J 5/12 136/205 |
| 2010/0118916 A1* | 5/2010 | Thomsen, III | G01K 7/028 374/179 |
| 2011/0013669 A1* | 1/2011 | Raj | G01K 1/08 374/179 |
| 2011/0277803 A1* | 11/2011 | Grande | G01K 13/002 136/225 |
| 2012/0324988 A1 | 12/2012 | Hockaday et al. | |
| 2014/0060606 A1 | 3/2014 | Smith et al. | |
| 2014/0192840 A1* | 7/2014 | Sun | G01K 1/14 374/208 |

* cited by examiner

FLEXIBLE LAMINATED THERMOCOUPLE

BACKGROUND OF THE INVENTION

The subject matter disclosed herein relates to a thermocouple and, more particularly, to a flexible laminated thermocouple with integrated electro-magnetic interference (EMI) shielding.

Advanced electrical systems will typically include multiple components or devices that generate heat during operation. Such components or devices may include, for example, electronic components and sets of electronic component housed within a housing, box or chassis (hereinafter referred to as a "chassis") of some sort. In order to control and monitor operations of these components or devices, especially when they are housed in the chassis, it is often helpful to generate data representative of their respective operating temperatures.

The above-noted control and monitoring can be difficult, however, since multiple thermocouples may need to be individually inserted into the chassis and placed in non-ideal locations to permit generation of the data. Once this is accomplished, surrounding electro-magnetic (EM) fields can affect the performance of the thermocouples and cause them to give erroneous results.

BRIEF DESCRIPTION OF THE INVENTION

According to one aspect of the invention, a flexible laminated thermocouple is provided and includes layers of insulation material. At least one of the layers has a longitudinal axis and includes thermocouple conductors formed of differing electrically conductive materials. Each of the thermocouple conductors includes a main section extending along the longitudinal axis and a flange extending transversely to the longitudinal axis. The main sections are insulated from one another and the thermocouple conductors are insulated from thermocouple conductors of another layer.

According to another aspect of the invention, a flexible laminated thermocouple is provided and includes layers of insulation material and electro-magnetic interference (EMI) shielding. At least one layer has a longitudinal axis and includes thermocouple conductors formed of differing electrically conductive materials, each of the thermocouple conductors including a main section extending along the longitudinal axis and a flange extending transversely to the longitudinal axis, and insulation disposed to insulate the main sections from one another and to insulate the thermocouple conductors from thermocouple conductors of another layer.

According to yet another aspect of the invention, a thermocouple assembly is provided and includes heat generating devices housed within a chassis and flexible laminated thermocouples respectively routed from an exterior of the chassis to each of the heat generating devices. Each flexible thermocouple includes laminated layers of insulation material and electro-magnetic interference (EMI) shielding. At least one layer has a longitudinal axis and includes thermocouple conductors formed of differing electrically conductive materials, each of the thermocouple conductors including a main section extending along the longitudinal axis and a flange extending transversely to the longitudinal axis, and insulation disposed to insulate the main sections from one another and to insulate the thermocouple conductors from thermocouple conductors of another layer.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As will be described below, a flexible laminated thermocouple can be assembled that would allow for an organization of multiple thermocouples together in a neat arrangement. The thermocouple can be additively manufactured by printing using a mesoscribe process, which is capable of printing a fully dense metallic trace. A nonconductive, insulative material, such as polyimide (Kapton™) can then be printed to separate each individual thermocouple layer. EMI shielding can also be printed using the mesoscribe process as needed to protect against EM interference within an enclosure, such as a chassis. The EMI shielding can be printed between layers, it can encompass the entire assembly or can be provided as combination of these options as required once individual thermocouples are formed. The EMI shielding may be placed proximate to one end of the assembly for attachment to individual heat generating devices.

Figure 2:
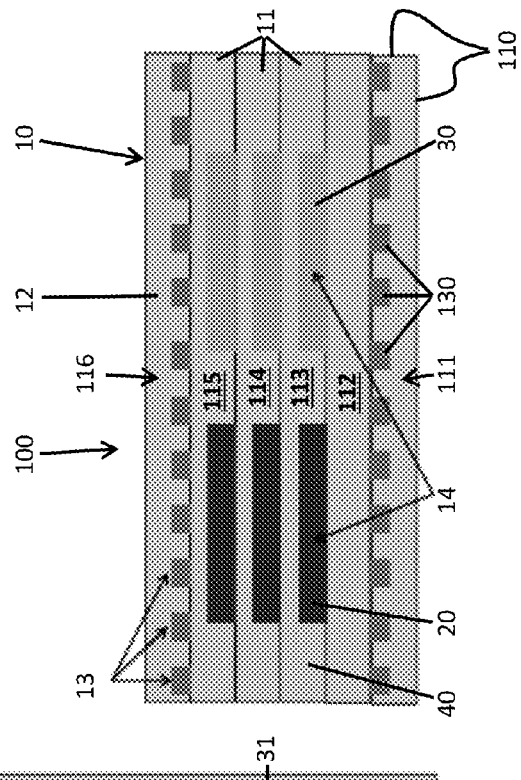
FIG. 2 is an elevational view of a central region of the thermocouple of FIG. 1.
Figure 1:
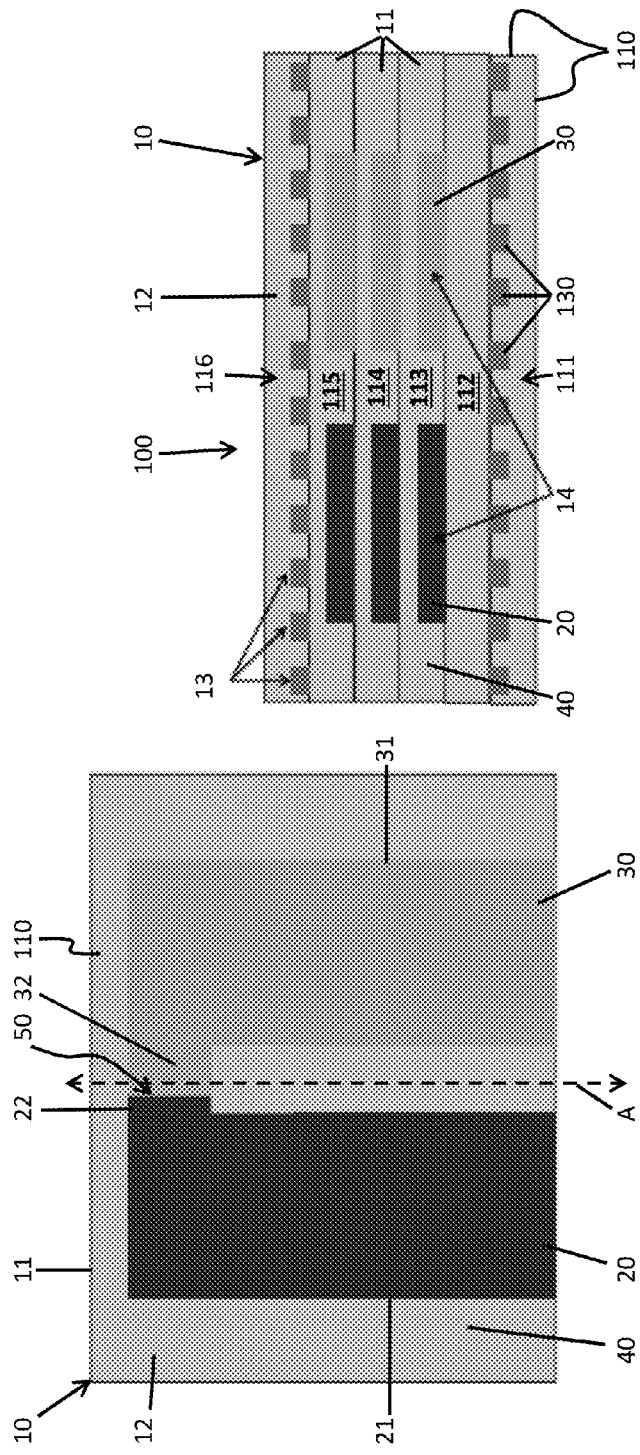
FIG. 1 is a plan view of a thermocouple in accordance with embodiments.
Figure 3:
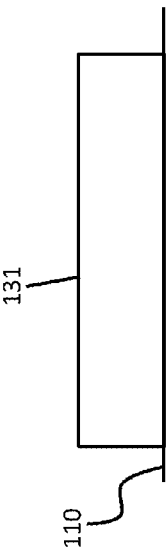
FIG. 3 is an enlarged view of EMI shielding in accordance with embodiments.

With reference to FIGS. 1-3, a flexible laminated thermocouple 10 is provided. The flexible laminated thermocouple 10 includes multiple layers 11 of insulation material 12, EMI shielding 13 and thermocouple conductors 14. At least one layer 11 has a longitudinal axis A and includes a first thermocouple conductor 20, a second thermocouple conductor 30 and insulation 40. The first thermocouple conductor 20 is formed of a first electrically conductive material and includes a first main section 21 and a first flange 22. The first main section 21 extends along the longitudinal axis A and the first flange 22 extends transversely to the longitudinal axis A proximate to an end 110 of the layer 11. The second thermocouple conductor 30 is formed of a second electrically conductive material that is different from the first electrically conductive material and includes a second main section 31 and a second flange 32. The second main section 31 extends along the longitudinal axis A and the second flange 22 extends transversely to the longitudinal axis A proximate to the end 110 of the layer 11.

The flexible laminated thermocouple 10 further includes a weld 50 by which a distal end 220 of the first flange 22 is electrically coupled with a distal end 320 of the second flange 32. But for this electrical coupling of the first and second flanges 22 and 32 at the weld 50, the insulation 40 is disposed to otherwise insulate the first main section 21 from the second main section 31 and to insulate the entirety of the first thermocouple conductor 20 and the entirety of the second thermocouple conductor 30 from any parts of any thermocouple conductor of another one of the layers 11.

Although only one layer 11 is discussed above, it will be understood that multiple layers 11 may be formed and that each of the multiple layers 11 may be substantially similar with one another (thus, the insulation 40 being disposed to otherwise insulate the first main section 21 from the second main section 31 and to insulate the entirety of the first thermocouple conductor 20 and the entirety of the second thermocouple conductor 30 from any parts of any thermocouple conductor of another one of the layers 11). These multiple layers 11 may be aligned vertically with one another or staggered.

In accordance with embodiments, the insulation material 40 may include at least one of polyimide, polyamide-imide and Kapton™ or a combination thereof. The first and second thermocouple conductors 20 and 30 may each be formed of a respective metallic material and, more particularly, one of the first and second thermocouple conductors 20 and 30 may be provided as a Type K thermocouple conductor (i.e., it is formed of a combination of Chromel and Alumel) and the other of the first and second thermocouple conductors 20 and 30 may be provided as a Type T thermocouple conductor (i.e., it is formed of a combination of Copper and Constantan).

The multiple layers 11 of the flexible laminated thermocouple 10 may be laminated together or otherwise formed as a result of an additive manufacturing printing process, such as a mesoscribe process. In any case, the layers 11 are ultimately laminated or combined together into an assembly 100 that has exterior surfaces 101. In accordance with embodiments, the assembly 100 may be about 10-20 mils tall and about 25-30 mils wide, while the first and second conductors 20 and 30 may be about 2 mils tall and about 10 mils wide. As shown in FIGS. 2 and 3 and, in accordance with further alternative embodiments, the EMI shielding 13 may be provided on one or more of the exterior surfaces 101 (see FIG. 3) or within particular layers 11 (see FIG. 2). In either case, the EMI shielding 13 may be provided to extend along the longitudinal axis A and may include a plurality of discrete shields 130 (see FIG. 2) or a continuous shield 131 (see FIG. 3).

Figure 4:
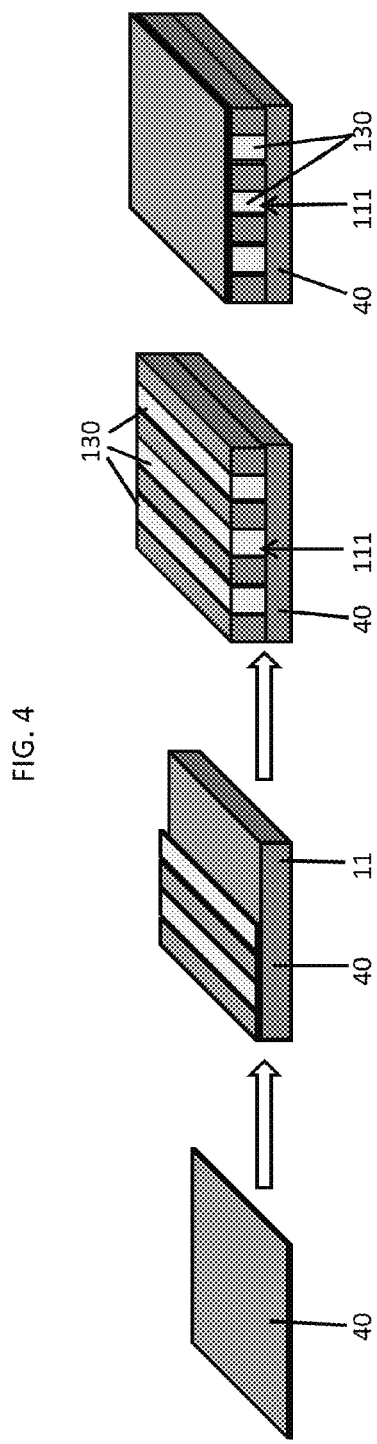
FIG. 4 is a flow diagram illustrating a manufacturing process for a thermocouple in accordance with embodiments.

With continued reference to FIG. 2 and with additional reference to FIG. 4, during the manufacturing process for the thermocouple 10, each layer 11 may be assembled, built or printed on a top surface of a preceding layer 11. Thus, for layer 111, the insulation 40 material may be laid down in successive sub-layers until those sub-layers are to include insulation 40 material and discrete shield 130 material. At that point, the insulation 40 material is laid down in successive sub-layers along with sub-layers of discrete shield 130 material in an interleaved sequence. This sequence will result in an upper-most sub-layer of layer 111 having interleaved insulation 40 material and discrete shield 130 material. Subsequently, layer 112 is laid down on the upper-most sub-layer of layer 111 in successive sub-layers of insulation 40 material. This process will proceed through layers 112-115 to ultimately result in the arrangement illustrated in FIG. 2 although it will be understood that the process will differ where the first and second flanges 22 and 32 are to be laid down.

Figure 5:
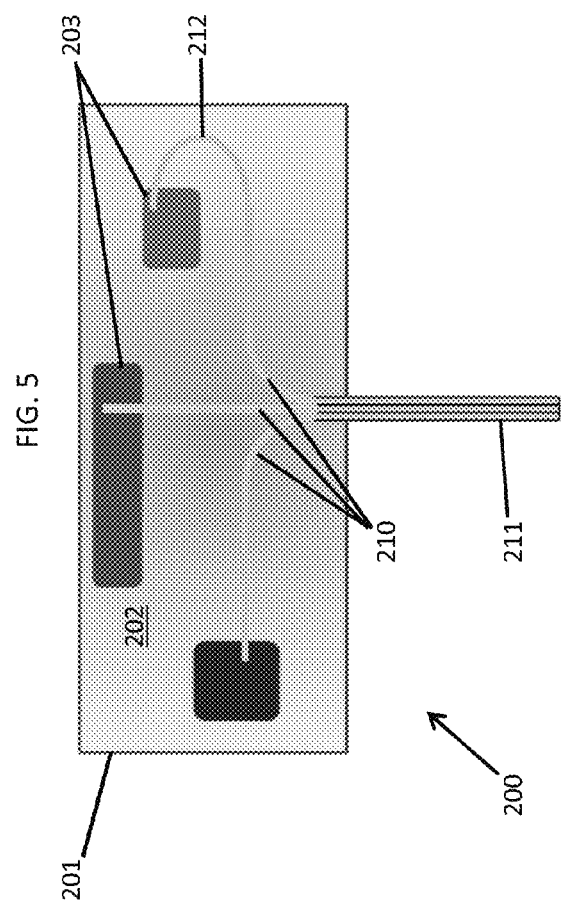
FIG. 5 is a plan view of a chassis having a thermocouple routed to multiple locations in accordance with embodiments.

With reference to FIG. 5 and, in accordance with further aspects, a thermocouple assembly 200 may be provided. As shown in FIG. 5, the thermocouple assembly 200 may include a chassis 201 that is provided as an enclosure defining an interior 202 and heat generating devices 203 housed within the interior 202 of the chassis 201. At least one or more of the heat generating devices 203 may be provided as an electrical device. The thermocouple assembly 200 may further include flexible laminated thermocouples 210 that are respectively routed from a bundle 211, which extends from an exterior of the chassis 201 to the interior 202, to each of the heat generating devices 203. This routing may include at least one or more curved section 212 for at least one or more of the laminated thermocouples 210 due to an offset in at least one dimension between the entrance of the chassis 201 and the corresponding heat generating device 203. Each flexible thermocouple 210 may be formed substantially as described above with respect to the thermocouple 10 of FIGS. 1-3.

The flexible laminated thermocouple 10 described above may be used as a single, efficient thermocouple in the thermocouple assembly 200 instead of or to replace multiple conventional thermocouples that can be messy and difficult to work with into. The flexible laminated thermocouple(s) 10 may thus provide for generation of data representative of the respective operating temperatures of the heat generating device(s) 203 so that the heat generating device(s) 203 can be controlled and monitored. The EMI shielding can be directly incorporated into the flexible laminated thermocouple(s) 10 in order to limit noise voltages of about 10-20 milli-volts at about 100 degrees Celsius. This elimination of noise voltages, in turn, eliminates or reduces a need for subsequent wire management.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A flexible laminated thermocouple, comprising:
   upper and lower layers of insulation material respectively comprising electro-magnetic interference (EMI) shielding along lower and upper surfaces thereof, respectively;
   a second layer of insulation material disposed on the lower layer of insulation material; and
   intermediate layers of insulation material disposed between the upper and the second layers of insulation material, at least one of the intermediate layers of insulation material having a longitudinal axis and comprising:
   thermocouple conductors formed of differing electrically conductive materials, each of the thermocouple conductors comprising a main section extending along the longitudinal axis and a flange extending transversely to the longitudinal axis, the main sections being insulated from one another and the thermocouple conductors being insulated from thermocouple conductors of another intermediate layer of insulation material.

2. The flexible laminated thermocouple according to claim 1, wherein the insulation material comprises at least one of polyimide, polyamide-imide and Kapton™.

3. The flexible laminated thermocouple according to claim 1, wherein the thermocouple conductors are each formed of a metallic material.

4. The flexible laminated thermocouple according to claim 1, wherein one of the thermocouple conductors is Type K and the other thermocouple conductor is Type T.

5. The flexible laminated thermocouple according to claim 1, further comprising a weld by which the respective flanges of each of the thermocouple conductors are electrically coupled to each other.

6. The flexible laminated thermocouple according to claim 1, wherein the upper, the lower, the second and the intermediate layers of insulation material are laminated.

7. The flexible laminated thermocouple according to claim 1, wherein the EMI shielding is discrete or continuous.

8. A flexible laminated thermocouple, comprising:
upper and lower layers of insulation material respectively comprising electro-magnetic interference (EMI) shielding along lower and upper surfaces thereof, respectively;
a second layer of insulation material disposed on the lower layer of insulation material; and
intermediate layers of insulation material disposed between the upper and the second layers of insulation material, at least one of the intermediate layers of insulation material having a longitudinal axis and comprising:
thermocouple conductors formed of differing electrically conductive materials, each of the thermocouple conductors comprising a main section extending along the longitudinal axis and a flange extending transversely to the longitudinal axis; and
insulation disposed to insulate the main sections from one another and to insulate the thermocouple conductors from thermocouple conductors of another intermediate layer of insulation material.

9. The flexible laminated thermocouple according to claim 8, wherein the insulation material comprises at least one of polyimide, polyamide-imide and Kapton™.

10. The flexible laminated thermocouple according to claim 8, wherein the thermocouple conductors are each formed of a metallic material.

11. The flexible laminated thermocouple according to claim 8, wherein one of the thermocouple conductors is Type K and the other thermocouple conductor is Type T.

12. The flexible laminated thermocouple according to claim 8, further comprising a weld by which the respective flanges of each of the thermocouple conductors are electrically coupled to each other.

13. The flexible laminated thermocouple according to claim 8, wherein the upper, the lower, the second and the intermediate layers of insulation material are laminated.

14. The flexible laminated thermocouple according to claim 8, wherein the EMI shielding is disposed between the layers.

15. The flexible laminated thermocouple according to claim 8, wherein the EMI shielding comprises a plurality of discrete shields.

16. The flexible laminated thermocouple according to claim 8, wherein the EMI shielding is continuous.

17. A thermocouple assembly, comprising:
heat generating devices housed within a chassis; and
flexible laminated thermocouples respectively routed from an exterior of the chassis to each of the heat generating devices, each flexible thermocouple comprising:
upper and lower laminated layers of insulation material respectively comprising electro-magnetic interference (EMI) shielding along lower and upper surfaces thereof, respectively;
a second laminated layer of insulation material laminated on the lower laminated layer of insulation material; and
intermediate laminated layers of insulation material laminated between the upper and the second layers of insulation material, at least one of the intermediate laminated layers of insulation material having a longitudinal axis and comprising:
thermocouple conductors formed of differing electrically conductive materials, each of the thermocouple conductors comprising a main section extending along the longitudinal axis and a flange extending transversely to the longitudinal axis; and
insulation disposed to insulate the main sections from one another and to insulate the thermocouple conductors from thermocouple conductors of another intermediate laminated layer of insulation material.

18. The thermocouple assembly according to claim 17, wherein at least one of the heat generating devices comprises an electrical device.

19. The thermocouple assembly according to claim 17, wherein the flexible laminated thermocouples are bundled at the exterior of the chassis.

20. The thermocouple assembly according to claim 17, wherein at least one of the flexible laminated thermocouples is curved.

* * * * *